US012576525B2

(12) United States Patent
Koga et al.

(10) Patent No.: US 12,576,525 B2
(45) Date of Patent: Mar. 17, 2026

(54) ROBOT SYSTEM

(71) Applicant: FANUC CORPORATION, Yamanashi (JP)

(72) Inventors: Kentaro Koga, Yamanashi (JP); Wataru Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 18/684,838

(22) PCT Filed: Sep. 27, 2021

(86) PCT No.: PCT/JP2021/035404
§ 371 (c)(1),
(2) Date: Feb. 20, 2024

(87) PCT Pub. No.: WO2023/047588
PCT Pub. Date: Mar. 30, 2023

(65) Prior Publication Data
US 2025/0121498 A1 Apr. 17, 2025

(51) Int. Cl.
*B25J 9/16* (2006.01)
*B25J 13/08* (2006.01)
*B25J 19/02* (2006.01)
*B25J 19/06* (2006.01)

(52) U.S. Cl.
CPC ........... *B25J 9/1661* (2013.01); *B25J 9/1674* (2013.01); *B25J 13/08* (2013.01); *B25J 19/023* (2013.01); *B25J 19/06* (2013.01)

(58) Field of Classification Search
None
See application file for complete search history.

(56) References Cited

U.S. PATENT DOCUMENTS

| | | | | |
|---|---|---|---|---|
| 6,285,921 | B1 * | 9/2001 | Ito | G05B 19/408 700/250 |
| 6,360,143 | B1 * | 3/2002 | Yanagita | B25J 9/1692 72/82 |
| 2005/0071048 | A1 * | 3/2005 | Watanabe | G05B 19/4069 700/259 |
| 2020/0398433 | A1 * | 12/2020 | Kelly | B25J 13/085 |
| 2021/0276203 | A1 * | 9/2021 | Carithers | B25J 15/0441 |

(Continued)

FOREIGN PATENT DOCUMENTS

| | | | |
|---|---|---|---|
| JP | 62-278610 A | * | 5/1986 |
| JP | S62-278610 A | | 12/1987 |
| JP | H04-101102 U | | 9/1992 |

(Continued)

*Primary Examiner* — Adam R Mott
*Assistant Examiner* — Alan Lindsay Ostrow
(74) *Attorney, Agent, or Firm* — HAUPTMAN HAM, LLP

(57) ABSTRACT

This robot system includes a robot and a robot control device for performing control so as to cause the robot to execute prescribed work on the basis of the result of detection of a subject to be detected by a sensor, the robot control device being provided with an abnormality-detection-time processing unit for, in accordance with sensing of an abnormality pertaining to the detection operation carried out by the sensor, controlling the robot so as to return to the position of a time point at which the detection serving as the source of the abnormality was carried out and then stop.

9 Claims, 9 Drawing Sheets

(56) References Cited

U.S. PATENT DOCUMENTS

| | | | |
|---|---|---|---|
| 2022/0410394 A1* | 12/2022 | Leong ........................ | G06T 7/70 |
| 2024/0225730 A1* | 7/2024 | Rubio Zamora ...... | A61B 34/32 |

FOREIGN PATENT DOCUMENTS

| | | |
|---|---|---|
| JP | H05-002205 U | 1/1993 |
| JP | H07-129217 A | 5/1995 |
| JP | H07-134605 A | 5/1995 |
| JP | H10-011124 A | 1/1998 |
| JP | 2005-103681 A | 4/2005 |
| JP | 2005-321979 A | 11/2005 |
| JP | 2019-188508 A | 10/2019 |
| JP | 2021-086194 A | 6/2021 |
| WO | 2010092981 A1 | 8/2010 |

* cited by examiner

Figure 1:
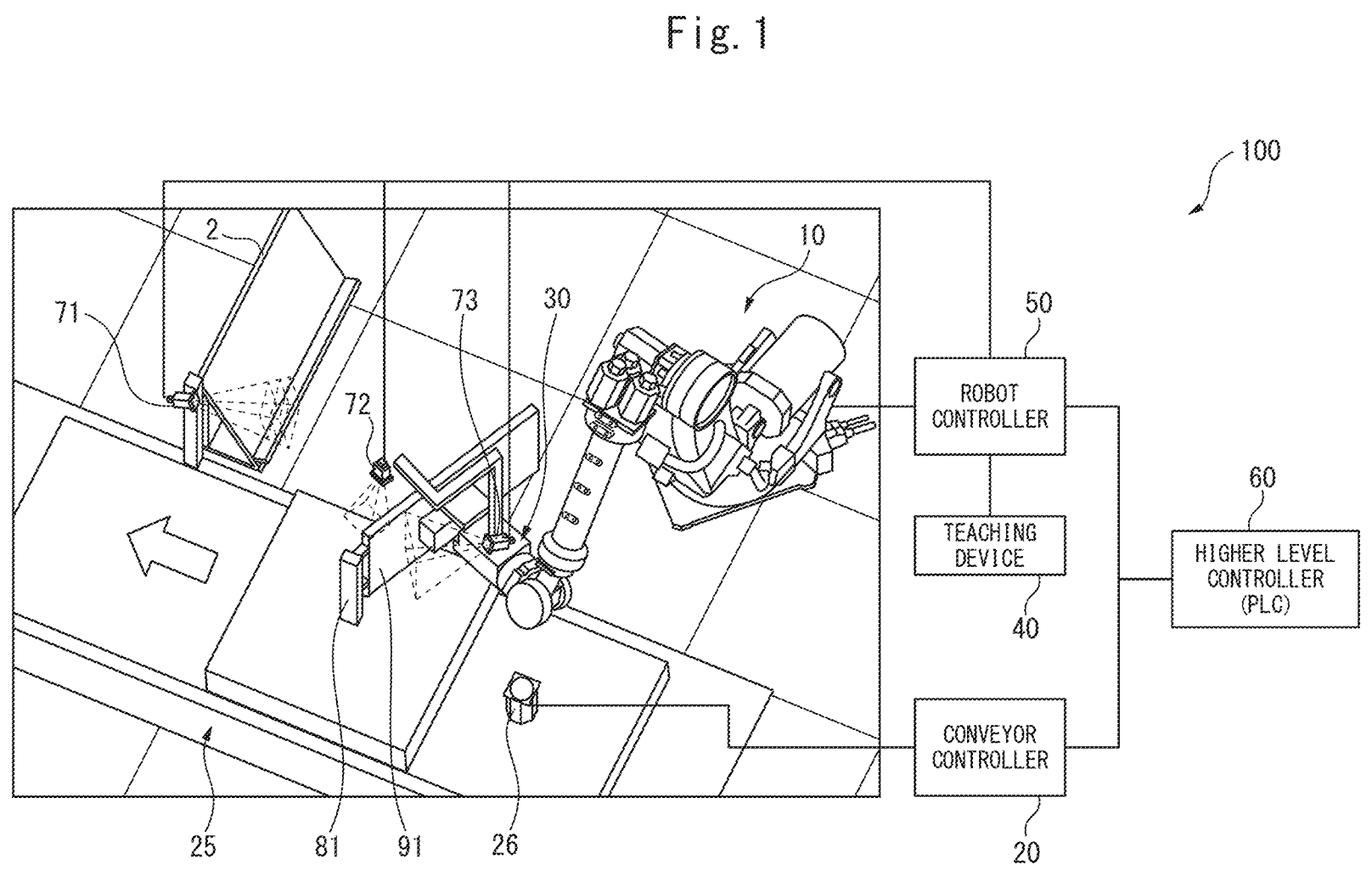

HIGHER LEVEL
CONTROLLER
(PLC)

60

ROBOT
CONTROLLER

50

TEACHING
DEVICE

40

CONVEYOR
CONTROLLER

<ERROR INFORMATION>
CAMERA #2:
  TARGET OBJECT IS UNDETECTED

ROBOT SYSTEM

RELATED APPLICATIONS

The present application is a National Phase of International Application No. PCT/JP2021/035404 filed Sep. 27, 2021.

FIELD

The present invention relates to a robot system.

BACKGROUND

A robot system including a conveying device conveying an article, a robot performing predetermined work on a conveyed article, a robot controller, and an image capture device for detecting an article, etc. has been previously known (for example, see PTL 1).

With regard to a controller of a working robot performing predetermined work in a production line, PTL 2 describes "a controller of a working robot having a function of, when a monitoring device monitoring a working state of a working device performing predetermined work on a workpiece recognizes an abnormality of a working state, temporarily returning the working device to the position where the abnormality is recognized and resuming the work from the position" (p. 2, lower right column, line 14 to 20).

CITATION LIST

Patent Literature

[PTL 1] Japanese Unexamined Patent Publication (Kokai) No. 2019-188508A
[PTL 2] Japanese Unexamined Patent Publication (Kokai) No. S62-278610A

SUMMARY

Technical Problem

A situation in which an operator performs teaching and adjustment of the operation of a robot system including a conveying device, a robot performing predetermined work on a conveyed article, a robot controller, and an image capture device, as described above, will be considered. In general, processing of, by the image capture device, capturing an image of an article or a conveying device and detecting the position thereof is repeated at a high speed, and the robot performs the work while tracking the article in such a robot system. It is difficult for an operator to check whether processing at each position of the robot, the article or the conveying device is performed without problems in such a process. Therefore, teaching and adjustment work for recovering the robot system from an abnormal state when a problem occurs in the robot system is time-consuming, and a boot-up time of the robot system is lengthened.

Solution to Problem

An embodiment of the present disclosure is a robot system including: a robot; and a robot controller configured to control the robot to execute predetermined work, based on a detection result of a detection target by a sensor, wherein the robot controller includes an abnormality detection processing unit configured to, in response to sensing of an abnormality related to a detection operation by the sensor, control the robot to return to a position at a time of detection being a cause of the abnormality and stop the robot at the position.

Advantageous Effects of Invention

According to the aforementioned configuration, the robot returns to and stops at the position at the time of detection being the cause of an abnormality, and therefore an operator can perform teaching and adjustment of the operation of the robot system in a state where each device of the robot system has returned to a spot where a problem has occurred without the need for heavy-burden work of moving the robot to the spot where the problem has occurred. Accordingly, the time required for teaching and adjustment of the operation of the robot system when a problem occurs in the robot system can be considerably reduced, and the time required for boot-up of the robot system etc. can be shortened.

The objects, the features, and the advantages of the present invention, and other objects, features, and advantages will become more apparent from the detailed description of typical embodiments of the present invention illustrated in accompanying drawings.

BRIEF DESCRIPTION OF DRAWINGS

FIG. 1 is a diagram illustrating a configuration of a robot system according to an embodiment.
FIG. 3 is a functional block diagram of the robot controller and the higher level controller.

DESCRIPTION OF EMBODIMENTS

Figure 2:
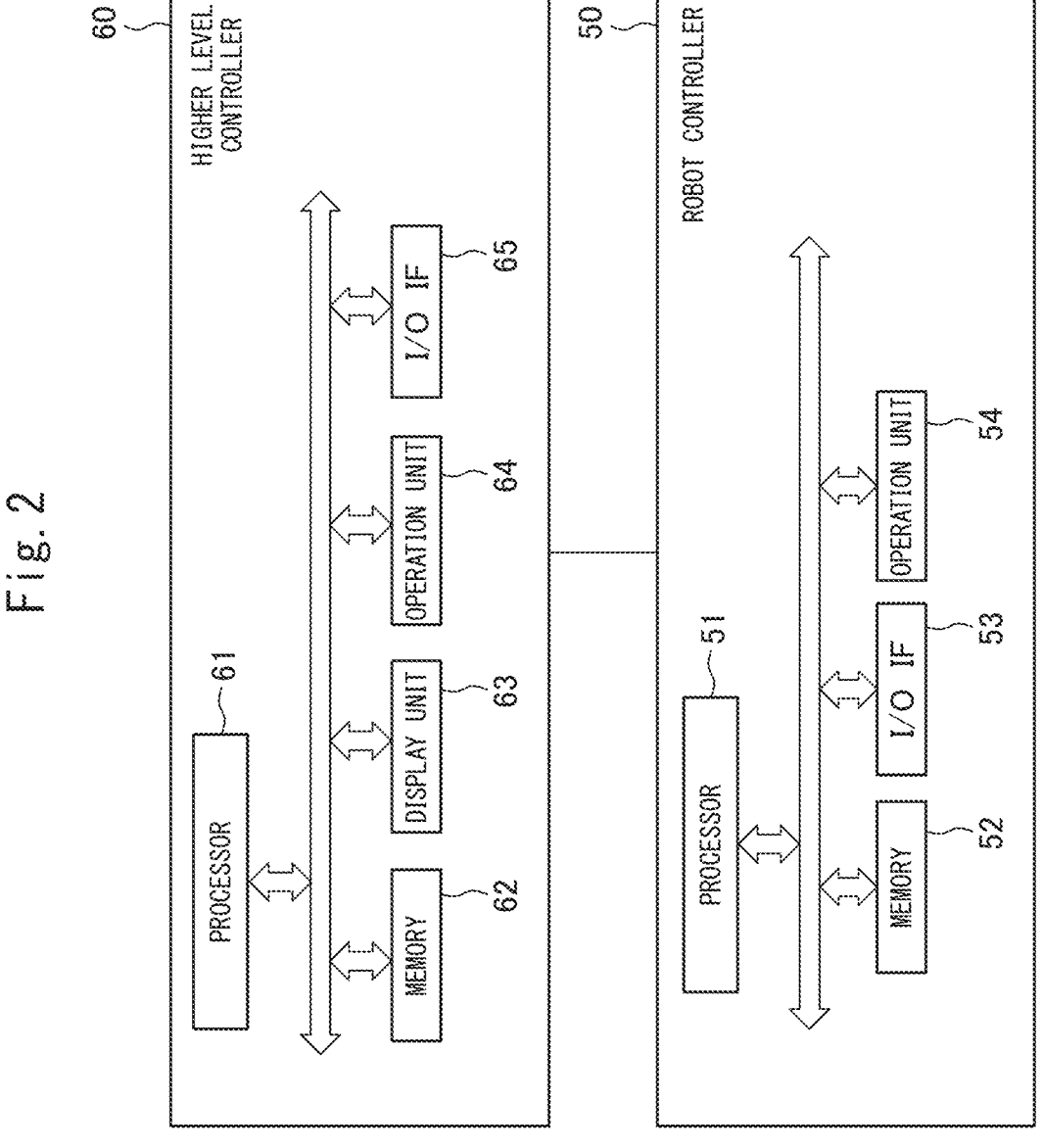
FIG. 2 is a diagram illustrating a hardware configuration example of a robot controller and a higher level controller.

Next, embodiments of the present disclosure will be described with reference to drawings. In the referenced drawings, similar components or functional parts are given similar reference signs. For ease of understanding, the drawings use different scales as appropriate. Further, configurations illustrated in the drawings are examples for implementing the present invention, and the present invention is not limited to the illustrated configurations.

FIG. 1 is a diagram illustrating a configuration of a robot system 100 according to an embodiment. As illustrated in FIG. 1, the robot system 100 includes a robot 10 including an arm tip equipped with a hand 30, a robot controller 50 controlling the robot 10, a conveying device (a conveyor 25 and a conveyor controller 20) conveying an article, three image capture devices 71 to 73, and a higher level controller 60. The robot controller 50 and the conveyor controller 20 are connected to the higher level controller 60, and the higher level controller 60 centrally controls the robot controller 50 and the conveyor controller 20 in such a way that predetermined work is executed in the robot system 100. A teaching device 40 may be connected to the robot controller 50 as illustrated in FIG. 1.

For example, the higher level controller 60 is a programmable logic controller (PLC) and centrally controls operation timings etc. of the robot controller 50 and the conveyor controller 20 in accordance with a control program for controlling operation sequences.

The image capture devices 71 to 73 are connected to the robot controller 50 and operate under the control of the robot controller 50. The robot controller 50 according to the present embodiment has a function of controlling each image capture device and a function of performing image processing on image data captured by each image capture device. Each of the image capture devices 71 to 73 may be a camera capturing a gray image and/or a color image, or a stereo camera or a three-dimensional sensor that can acquire a range image and/or a three-dimensional point group. It is assumed in the present embodiment that each image capture device is a camera acquiring a two-dimensional image.

The conveyor controller 20 controls conveyance of a workpiece by the conveyor 25 by controlling drive of a motor 26 of the conveyor 25.

For example, the teaching device 40 is used for adjusting the contents of teaching and a program. For example, the teaching device 40 may be a teach pendant, a tablet terminal, a smartphone, or another type of information processing device.

In the robot system 100, in response to sensing of abnormality in the detection operation by the image capture devices 71 to 73, the robot controller 50 performs control in such a way as to return the robot 10 to the position at the time of sensing of the abnormality and stops the robot 10 at the position. Thus, an operator can perform adjustment of the operation of the robot system in a state where the robot has returned to and stopped at a position where a problem has occurred without the need for performing manual operation for moving the robot.

While the configuration according to the present embodiment is applicable to a robot system that may execute various types of processing (such as detection and determination) by using a visual sensor, a configuration in which the robot 10 performs work of gripping a workpiece 91 placed against a stand 2 and attaching the workpiece 91 to a workpiece 81 conveyed on the conveyor 25 will be described as an example. It is assumed as an example that the workpiece 91 is a door of a vehicle and the workpiece 81 is a vehicle body to which the door is attached. The robot 10 repeatedly executes work of attaching a workpiece 91 to each of workpieces 81 successively conveyed on the conveyor 25 in the direction of an arrow in FIG. 1, and an image capture-detection operation on a detection target by the image capture devices 71 to 73 is repeatedly executed during the execution of the work.

FIG. 2 is a diagram illustrating a hardware configuration example of the higher level controller 60 and the robot controller 50. The higher level controller 60 may have a configuration as a common computer including a memory 62 (such as a ROM, a RAM, or a nonvolatile memory), a display unit 63, an operation unit 64 configured with an input device such as a keyboard (or software keys), an input-output interface 65, etc. that are connected to a processor 61 through a bus. The robot controller 50 may have a configuration as a common computer including a memory 52 (such as a ROM, a RAM, or a nonvolatile memory), an input-output interface 53, an operation unit 54 including various operation switches, etc. that are connected to a processor 51 through a bus. The teaching device 40 may also have a configuration as a common computer including a processor, a memory, a display unit, an operation unit, various input-output interfaces, etc.

Figure 3:
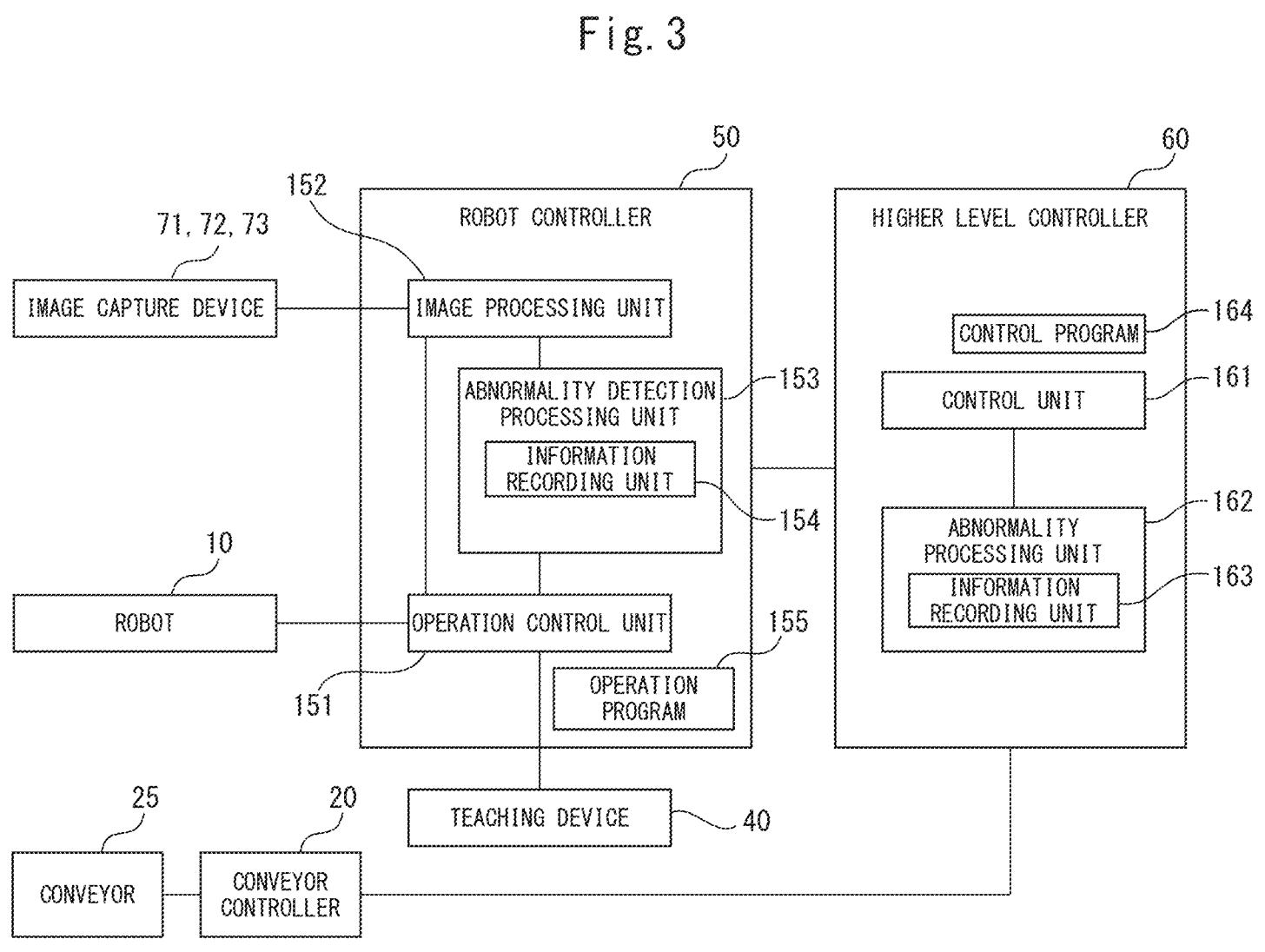

FIG. 3 is a functional block diagram of the robot controller 50 and the higher level controller 60. As illustrated in FIG. 3, the robot controller 50 includes an operation control unit 151 controlling operation of the robot 10 (and the hand 30) in accordance with a command from the teaching device 40 or an operation program 155, an image processing unit 152 executing control of the image capture devices 71 to 73 and image processing on a captured image, and an abnormality detection processing unit 153 performing, in response to sensing of abnormality in a detection operation by any of the image capture devices 71 to 73, control in such a way as to return the robot 10 to the position at the time of detection of the abnormality. An information recording unit 154 acquires and records the position of the robot 10 at the time of detection of the abnormality and other information. The abnormality detection processing unit 153 also has a function of transmitting, in response to sensing of abnormality in a detection operation by any of the image capture devices 71 to 73, a signal indicating the sensing of the abnormality to the higher level controller 60.

The higher level controller 60 includes a control unit 161 controlling operation sequences of the robot controller 50 and the conveyor controller 20 in accordance with a control program 164 and an abnormality processing unit 162 performing, in response to reception of a signal indicating sensing of the aforementioned abnormality from the robot controller 50, control in such a way as to return the conveyor 25 to the position at the time of detection of the abnormality. An information recording unit 163 acquires and records the position of the conveyor 25 at the time of detection of the abnormality and other information.

An example of a detection operation on a target by the image capture devices 71 to 73 performed while the robot 10 executes the predetermined work will be described. The image capture device 71 is a fixed camera and, when the robot 10 grips a workpiece 81 placed against the stand 2, captures an image of the state only once and detects a misaligned grip.

The image capture devices 72 and 73 are fixed to an arm tip of the robot 10. The image capture direction of each of the image capture devices 72 and 73 is set in such a way that the device captures an image of an area around an attachment position when the robot 10 attaches a workpiece 91 to a workpiece 81. The image capture devices 72 and 73 repeat image capture while the robot 10 performs work of attaching a workpiece 91 to a workpiece 81 while moving the workpiece 91.

Alignment control of a workpiece 91 relative to a workpiece 81 using the image capture device 72 or 73, the control being executed as part of such attachment work, will be described. A case of using an image captured by the image capture device 72 will be described. Control of, in a stage when the robot 10 moves the workpiece 91 to a position where the workpiece 91 is attachable to the workpiece 81, capturing an image of the state by the image capture device 72 and adjusting the position of the robot 10 is executed in the alignment control.

Figure 4:
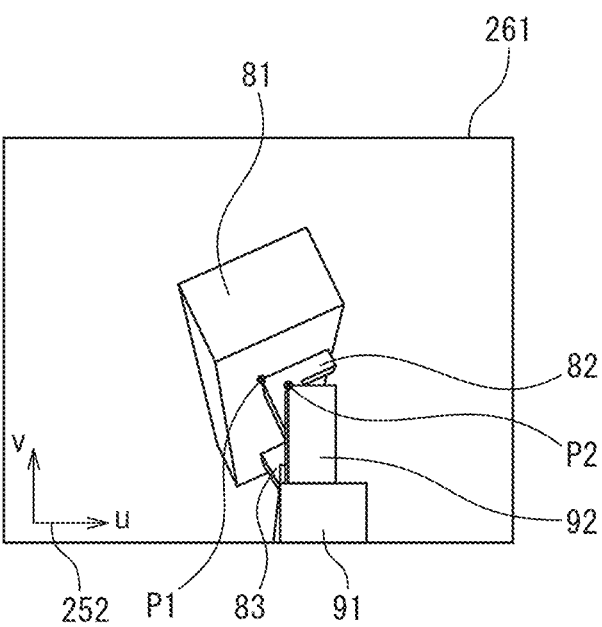
FIG. 4 is an example of a standard image when detection by an image capture device is performed.

FIG. 4 illustrates an image captured by the image capture device 72 under normal operation when the robot 10 is at a position where the workpiece 91 is attachable to the workpiece 81 (assumed to be a position where a pin on the workpiece 91 is insertable into a hole on the workpiece 81 by moving the workpiece 91 downward in the vertical direction). The image is an image when the robot 10 is at a correct position and therefore is hereinafter also referred to as a standard image 261.

The image processing unit 152 in the robot controller 50 has a function of detecting feature values of feature parts being predetermined characteristic parts in the workpiece 81 and the workpiece 91. The image processing unit 152 further has a function of calculating the difference between the feature value of the workpiece 81 and the feature value of the workpiece 91 as a relative value. The image processing unit 152 generates a command for operating the robot 10, based on the calculated relative value.

In the robot system 100, alignment of the workpiece 91 relative to the workpiece 81 conveyed by the conveyor 25 is performed based on images captured by the image capture devices 72 and 73. Specifically, alignment when pins (unillustrated) on the workpiece 91 (a door) are inserted into holes 82a and 83a (see FIG. 6) formed in protruding parts 82 and 83 of the workpiece 81 (a vehicle body) is performed.

The image processing unit 152 calculates a relative position value in the standard image 261 by the following procedures (A1) to (A3) before actual work is performed by the robot 10.

(A1) The image processing unit 152 detects the top surface of the protruding part 82 as a first feature part for detecting the position of the workpiece 81 and detects the top surface of the protruding part 92 of the workpiece 91 as a second feature part for detecting the position of the workpiece 91. It should be noted that for example, a part of a workpiece, a pattern formed on the surface of a workpiece, or a line or a diagram described on the surface of a workpiece may be employed as a feature part. As a detection method for detecting a feature part, a base image being a standard for each of the workpieces 81 and 91 may be previously prepared, and by using the base image and an image captured by the image capture device 72, a feature part in the image captured by the image capture device 72 may be detected by a method such as template matching.

(A2) Next, the image processing unit 152 detects a first feature value related to the position of the first feature part and a second feature value related to the position of the second feature part. A screen coordinate system 252 is set to the image captured by the image capture device 72. The screen coordinate system 252 is a coordinate system defined when an arbitrary point in the image is set to the origin. The screen coordinate system 252 includes a u-axis and a v-axis orthogonal to each other. The screen coordinate system 252 is related to a visual sensor coordinate system at the image capture device 72. A feature value related to a position according to the present embodiment is a coordinate value of the u-axis and a coordinate value of the v-axis in the screen coordinate system 252 in the image. Based on the feature parts detected in the standard image 261, the image processing unit 152 can detect the positions of set points P1 and P2 set to the feature parts. The image processing unit 152 detects a coordinate value (u1b, v1b) of the set point P1 in the screen coordinate system 252 as the first feature value. Further, a feature value detection unit detects a coordinate value (u2b, v2b) of the set point P2 in the screen coordinate system 252 as the second feature value.

(A3) Next, the image processing unit 152 calculates a relative value between the first feature value and the second feature value in the standard image. In order to control the position of the robot 10, the image processing unit 152 calculates a relative position value as the relative value. The relative position value is the difference between the first feature value and the second feature value. For example, the image processing unit 152 calculates the difference (u1b−u2b, v1b−v2b) between the coordinate value of the first feature value and the coordinate value of the second feature value as the relative position value. The calculated relative position value in the standard image 261 is stored as a standard relative position value.

Thus, the image processing unit 152 can calculate the relative position value in the standard image 261. It is assumed in the present embodiment that the relative position value in the standard image 261 is previously calculated and is stored in a storage unit.

Figure 5:
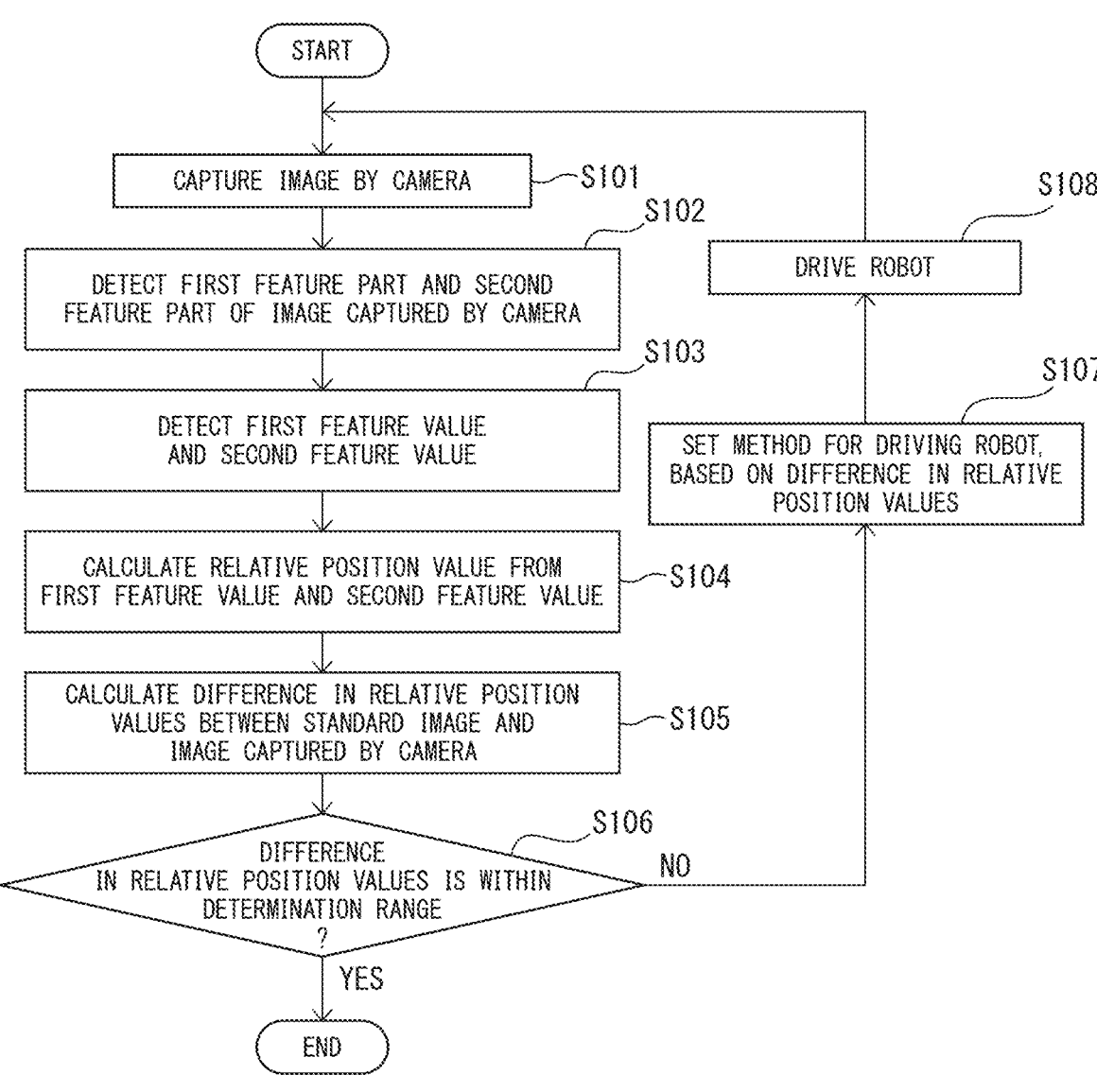
FIG. 5 is a flowchart of alignment control using the image capture device.

FIG. 5 illustrates a flowchart of the alignment control. This processing is executed under the control of the processor 51 in the robot controller 50. After the robot controller 50 performs control of bringing the workpiece 91 close up to a position where the workpiece 91 is attachable to the workpiece 81, the operation control unit 151 captures an image of the workpieces 81 and 91 by the image capture device 72 in step S101.

Figure 6:
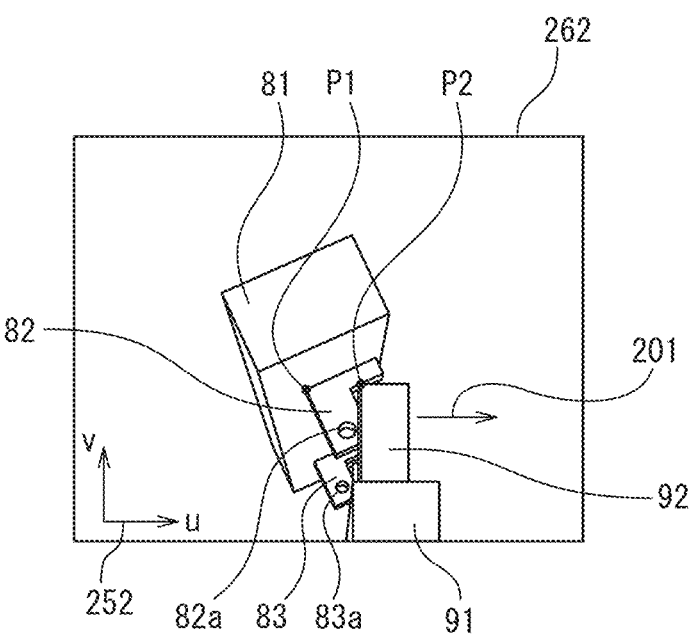
FIG. 6 is an example of a captured image at the time of the alignment control.

FIG. 6 illustrates an image 262 captured by the image capture device 72 in step S101. The image 262 includes an image of the top surface of the protruding part 82 being the first feature part and an image of the top surface of the protruding part 92 being the second feature part. The workpiece 91 is misaligned on the positive side of the u-axis of the screen coordinate system 252 relative to the workpiece 81 as indicated by an arrow 201 in the image 262.

In step S102, the image processing unit 152 detects the first feature part and the second feature part of the image 262 captured by the image capture device 72. The top surface of the protruding part 82 of the workpiece 81 is detected as the first feature part, and the top surface of the protruding part 92 of the workpiece 91 is detected as the second feature part.

Next, in step S103, the image processing unit 152 detects a first feature value and a second feature value in the image captured by the image capture device 72. The image processing unit 152 detects the coordinate value (u1m, v1m) of the set point P1 in the screen coordinate system 252 as the first feature value related to the first feature part and calculates the coordinate value (u2m, v2m) of the set point P2 in the screen coordinate system as the second feature value related to the second feature part.

Next, in step S104, the image processing unit 152 calculates the difference between the first feature value and the second feature value as a relative position value. The relative position value in the image 262 captured by the image capture device 72 is the difference (u1m−u2m, v1m−v2m) between the coordinate value of the first feature value and the coordinate value of the first feature value.

Next, in step S105, the image processing unit 152 calculates a difference in relative position values being the difference between the relative position value in the image 262 and the relative position value in the standard image 261. The difference in relative position values can be expressed by [(u1m−u2m)−(u1b−u2b), (v1m−v2m)−(v1b−v2b)] as values related to the u-axis and the v-axis, respectively.

Next, in step S106, whether the difference in relative position values is within a predetermined range is determined. When the difference in relative position values is within the previously determined range (S120: YES), alignment of the workpiece 91 relative to the workpiece 81 is considered complete, and this processing is ended.

On the other hand, when the difference in relative position values is out of the previously determined range (S120: NO), the workpiece 91 may be determined to have not reached a desired position relative to the workpiece 81. In this case, the processing is moved to step S107.

In step S107, the image processing unit 152 sets a method for driving the robot 10, based on the difference in relative position values. The image processing unit 152 sets a moving direction and a moving value of the robot in a standard coordinate system. According to the present embodiment, the moving direction of the position of the robot 10 with respect to the difference in relative position values is previously determined based on a relative positional relation between the screen coordinate system 252 and the standard coordinate system of the robot 10. For example, the moving direction of the position of the robot is determined for a positive value or a negative value on the u-axis of the screen coordinate system in the standard coordinate system as follows. When the difference in relative position values related to the u-axis is a positive value, a moving direction of (1, 1, 0) is determined by using coordinate values on an X-axis, a Y-axis, and a Z-axis of the standard coordinate system. Further, when the difference in relative position values related to the y-axis is positive, a moving direction of (0, 0, 1) is determined by using coordinate values on the X-axis, the Y-axis, and the Z-axis of the standard coordinate system.

Furthermore, for example, a method for calculating a moving value of the position of the robot for the difference in relative position values is determined as follows. A value acquired by multiplying a value $[(u1m-u2m)-(u1b-u2b)]$ related to the u-axis by a predetermined coefficient may be employed as the moving value of the position of the robot in a direction related to the u-axis. Further, a value acquired by multiplying a value $[(v1m-v2m)-(v1b-v2b)]$ related to the v-axis by a predetermined coefficient may be employed as the moving value of the position of the robot in a direction related to the v-axis. Thus, the moving value of the position of the robot 10 can be calculated in the direction related to each axis of the screen coordinate system 252.

Next, in step S108, the robot 10 is driven based on the moving direction and the moving value of the position of the robot calculated as described above. The image processing unit 152 generates a move command for driving the robot 10, based on the moving direction and the moving value of the position of the robot. The image processing unit 152 transmits the move command to the operation control unit 151. The operation control unit 151 controls the position of the robot 10 in accordance with the move command. Then, the processing from step S115 is repeated. Such control can gradually bring the position of the workpiece 91 closer to a desired position.

The image processing unit 152 has a function of sensing an abnormality in a detection operation by one of the image capture devices 71 to 73. The following situations may be considered as examples of abnormality sensing.

(B1) A state of a detection target (such as a feature part) not being detected in an image continues.

(B2) When an image of a moving detection target is continuously captured, a situation in which detected positions of the detection target are not continuous (are at unexpected positions) occurs.

Figure 7:
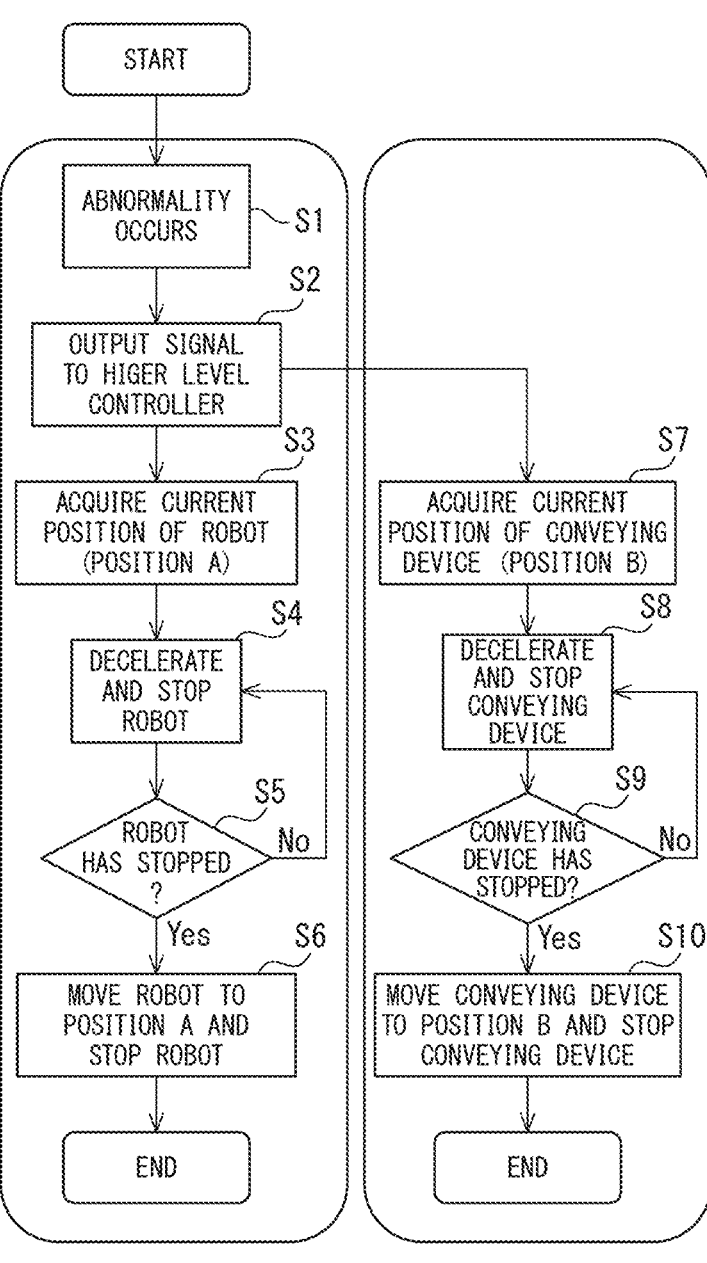
FIG. 7 is a flowchart illustrating abnormality occurrence processing.

FIG. 7 is a flowchart illustrating abnormality detection processing executed when an abnormality in a detection operation by an image capture device is sensed in the robot system 100. A flow described by steps S1 to S6 in the abnormality detection processing is executed under the control of the processor 51 in the robot controller 50, and a flow described by steps S7 to S10 is executed under the control of the processor 61 in the higher level controller 60.

It is assumed that an abnormality in a detection operation by one of the image capture devices 71 to 73 due to occurrence of the situation (B1) or (B2) exemplified above is sensed (step S1).

In step S2, the robot controller 50 (the abnormality detection processing unit 153) transmits a signal indicating sensing of an abnormality to the higher level controller 60.

Next, the abnormality detection processing unit 153 (the information recording unit 154) acquires the current position of the robot 10 (a position A) (step S3). The position of the robot 10 includes a posture. Then, the robot controller 50 (the abnormality detection processing unit 153) decelerates and stops the robot 10 in order to safely stop the robot 10 (step S4).

Next, the robot controller 50 (the abnormality detection processing unit 153) determines whether the robot 10 has stopped (step S5). The robot controller 50 (the abnormality detection processing unit) waits for the robot to stop (S5: NO).

When the robot stops (S5: YES), the robot controller 50 (the abnormality detection processing unit 153) moves the robot 10 to the position A at the time of sensing of the abnormality and stops the robot 10 at the position A.

When receiving the signal indicating sensing of the abnormality from the robot controller 50, the higher level controller 60 (the information recording unit 163) acquires information about the current position of the conveyor (a position B) (step S7). Next, the higher level controller 60 (the abnormality processing unit 162) decelerates and stops the conveyor 25 in consideration of the safety aspect (step S8).

Next, the higher level controller 60 (the abnormality processing unit 162) determines whether the conveyor 25 has stopped (step S9). The higher level controller 60 (the abnormality processing unit 162) waits until the conveyor 25 stops (S9: NO). When the conveyor 25 stops (S9: YES), the higher level controller 60 (the abnormality processing unit 162) moves the conveyor 25 to the position B being the position at the time of occurrence of the abnormality and stops the conveyor 25 at the position B (step S10). Through the processing described above, when an abnormality in the detection operation by an image capture device is sensed, the robot 10 and the conveyor 25 can be returned to the position at the time of sensing of the abnormality.

In addition to returning the robot 10 and the conveyor 25 to the position at the time of detection of an abnormality, one or more of the following operations (C1) to (C3) may be further performed in the robot system 100.

(C1) Perform image capture by each image capture device in a state of each piece of equipment constituting the robot system being returned to the state at the time of sensing of the abnormality and present the captured image.

(C2) Present detailed information about the abnormality.

(C3) Present information about operating conditions of the robot system at the time of sensing of the abnormality.

The aforementioned operation (C1) may be achieved by, after the robot 10 and the conveyor 25 return to the position at the time of sensing of the abnormality, the abnormality detection processing unit 153 operating in such a way as to operate each of the image capture devices 71 to 73 through the image processing unit 152 and cause a display unit 41 in the teaching device 40 to display a captured image. Since the state of the abnormality may be reproduced in such a captured image, an operator can appropriately pursue, for example, adjustment of the position of the robot 10 in the operation program, adjustment of an operation timing of the robot 10, or adjustment of the installation position of an image capture device while observing such a captured image.

Figure 8:
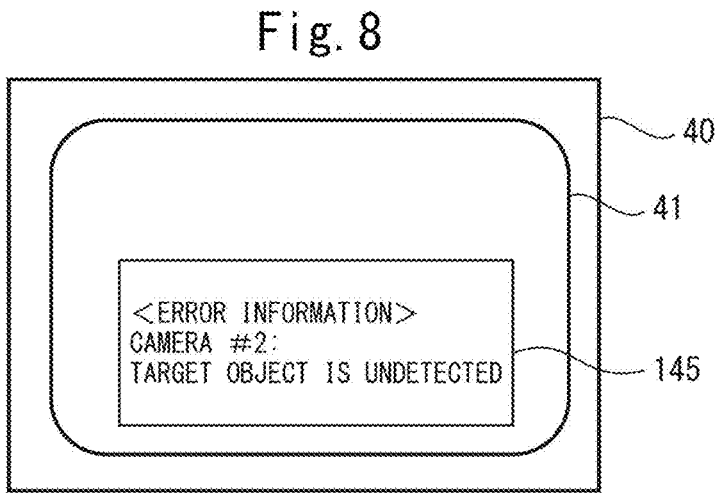
FIG. 8 is a diagram illustrating an example of displaying detailed information about an abnormality.

For example, the aforementioned operation (C2) may be achieved by the information recording unit 154 in the robot controller 50 acquiring detailed information about an abnormality when the abnormality is sensed by operating in coordination with the image processing unit 152 or the operation control unit 151 and the abnormality detection processing unit 153 displaying the detailed information about the abnormality acquired by the information recording unit 154 on the teaching device 40. FIG. 8 illustrates an example of details of an abnormality being displayed on a display screen of the teaching device 40 (the display unit 41) by the abnormality detection processing unit 153 when abnormality in a detection operation by an image capture device is sensed. In this example, an error display screen 145 presenting a message to the effect that the cause of the abnormality is a target object being undetected by the image capture device (a camera #2 in this example) is displayed. In this case, an operator can appropriately pursue adjustment of the position of the robot 10 in the operation program, adjustment of an operation timing of the robot 10, adjustment of the installation position of the image capture device, etc. with detailed information about the abnormality presented here as a lead.

In other words, such a configuration in which detailed information about an abnormality is presented to an operator enables efficient pursuit of adjustment for recovery from the abnormality.

As an example of the aforementioned operation (C3), the information recording unit 154 in the robot controller 50 may be configured to record information about operating conditions of the robot 10 (such as the position, the posture, and the operating speed of the robot) at the time of sensing of an abnormality. Further, the information recording unit 163 in the higher level controller 60 may be configured to record information about operating conditions of the conveyor 25 (such as the position and the speed) at the time of sensing of an abnormality. For example, the information about the operating conditions of the robot 10 and the conveyor 25 may also be displayed on the display unit 41 of the teaching device 40. Such information about the operating conditions may also enhance efficiency of adjustment by an operator.

Presentation of information by the aforementioned operations (C1) to (C3) may be performed on a device including a display unit in the robot system 100 (such as the higher level controller 60) without being limited to the aforementioned examples.

As described above, according to the present embodiment, the robot returns to and stops at the position at the time of detection being the cause of an abnormality, and therefore an operator can perform teaching and adjustment of the operation of the robot system in a state where each device of the robot system has returned to a spot where a problem has occurred without the need for heavy-burden work of moving the robot to the spot where the problem has occurred. Accordingly, the time required for teaching and adjustment of the operation of the robot system when a problem occurs in the robot system can be considerably reduced, and the time required for boot-up of the robot system etc. can be shortened.

While the present invention has been described above by using the typical embodiments, it may be understood by a person skilled in the art that changes, and various other changes, omissions, and additions can be made to the aforementioned embodiments without departing from the scope of the present invention.

It should be understood that the configuration of the robot system 100 illustrated in FIG. 1 is an exemplification and not every component thereof is an essential component. For example, a system configuration acquired by omitting the conveyor 25 and the conveyor controller 20 from the robot system 100 may also be employed.

While the aforementioned embodiment relates to a robot system detecting an object by an image capture device as a visual sensor and executing predetermined work, the present invention may be applied to a robot system including another type of sensor (such as a proximity sensor or a range sensor) for detecting an object. When such another type of sensor is used in a robot system, an output result of the sensor is presented in the aforementioned operation (C1).

The configuration described in the aforementioned embodiment in which the time required for boot-up of a system may be shortened by returning a robot, or the robot and each movable machine to the position at the time of occurrence of a problem and performing various adjustments is applicable to robot systems in various configurations.

Figure 9:
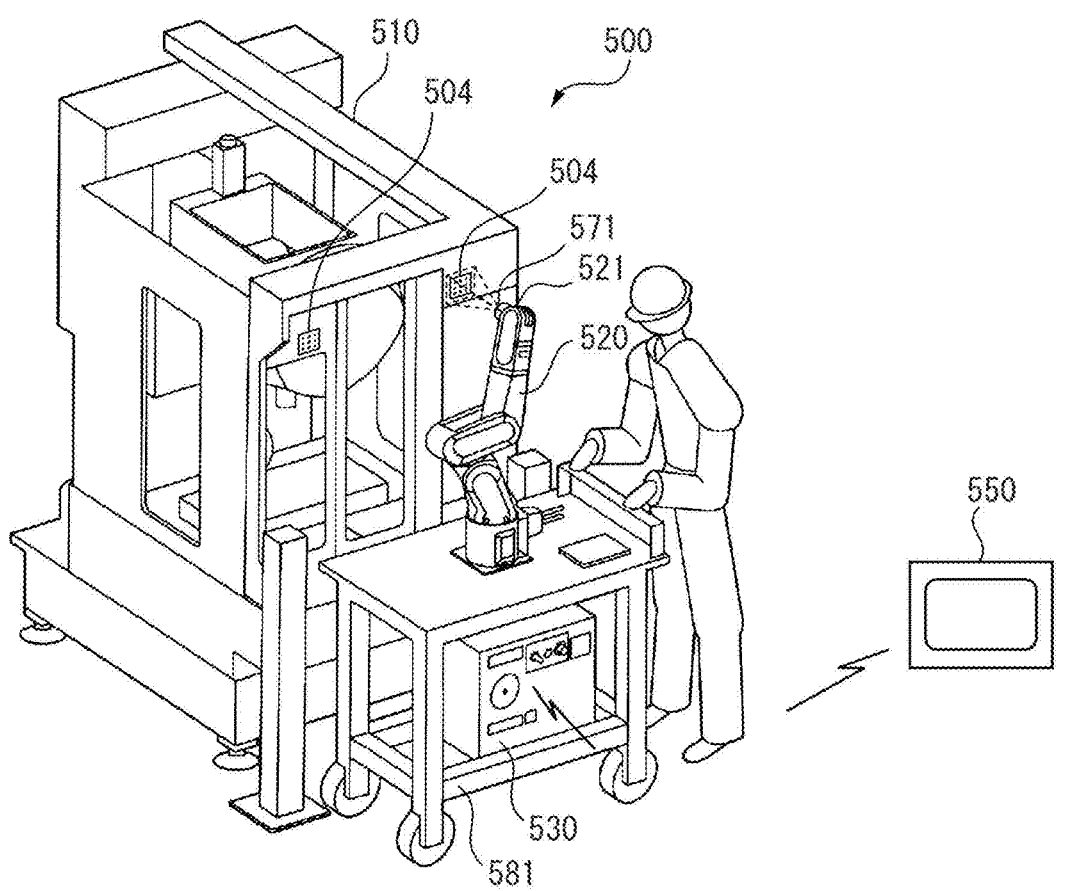
FIG. 9 is a diagram illustrating a configuration of a robot system according to another embodiment.

Another embodiment will be described with reference to FIG. 9 and FIG. 10. The embodiment described here relates to a robot system configured to be able to correct the position of a robot relative to a workspace by detecting a marker placed in the workspace by a visual sensor mounted on the robot. FIG. 9 is a diagram illustrating an equipment configuration of a robot system 500. The robot system 500 includes a machine tool 510, a robot 520, a robot controller 530 controlling the robot 520, and a conveying device 581 for conveying the robot 520 and the robot controller 530. The robot 520 is placed at a predetermined position in front of the machine tool 510 in a state of being loaded on the conveying device 581 and executes predetermined work such as loading/unloading of a work target object (hereinafter described as a workpiece) into/from the machine tool 510. In other words, the robot system 500 is configured as an automation system for automating loading/unloading of a workpiece into/from the machine tool 510 by the robot 520. For example, the conveying device 581 is a trolley or an automated guided vehicle (AGV).

A teaching device 550 is connected to the robot controller 530 in a wireless or wired manner and is used for teaching positions and postures to the robot 520. Since a control program generated by using the teaching device 550 is in a state of being registered in the robot controller 530 in actual operation of the robot system 500, the teaching device 550 may be omitted from the robot system 500 in actual operation of the robot system 500.

When the robot 520 executes work, such as loading/ unloading of a workpiece, in the robot system 500 as illustrated in FIG. 9, the position of the conveying device 581 loaded with the robot 520 changes. Accordingly, robot 520 is preferably configured in such a way as to be able to measure misalignment of the robot 520 relative to the machine tool 510 and correctly perform the work on the machine tool 510. Therefore, a visual sensor 571 is mounted on an arm tip 521 of the robot 520, and the robot 520 (the robot controller 530) is configured in such a way as to detect misalignment of the robot 520 relative to the workspace (the machine tool 510) by using the visual sensor 571, correct the misalignment, and execute the work.

The teaching device 550 provides a function of generating a program for measuring the three-dimensional position of a marker 504 installed at a predetermined position in a workspace (the machine tool 510) by the visual sensor 571 mounted on the arm tip 521 of the robot 520 and measuring misalignment of the robot 520 from an intended position in the workspace (such a program is hereinafter also referred to as a measurement program). A control program including the measurement program generated by using the teaching device 550 is registered in the robot controller 530, and from there onward, the robot 520 (the robot controller 530) can operate in such a way as to detect misalignment of the robot 520 from the intended position in the workspace, perform position correction, and execute predetermined work.

The visual sensor 571 may be a two-dimensional camera or a three-dimensional position detector. It is assumed in the present embodiment that the visual sensor 571 is a two-dimensional camera. The visual sensor 571 is connected to the robot controller 530. It is assumed that the robot controller 530 has a function for controlling the visual sensor 571, a function of performing various types of image processing on an image captured by the visual sensor 571, etc. It is further assumed that calibration data including data indicating the position of the visual sensor 571 relative to the robot 520 are previously stored in a memory in the robot controller 530.

Figure 10:
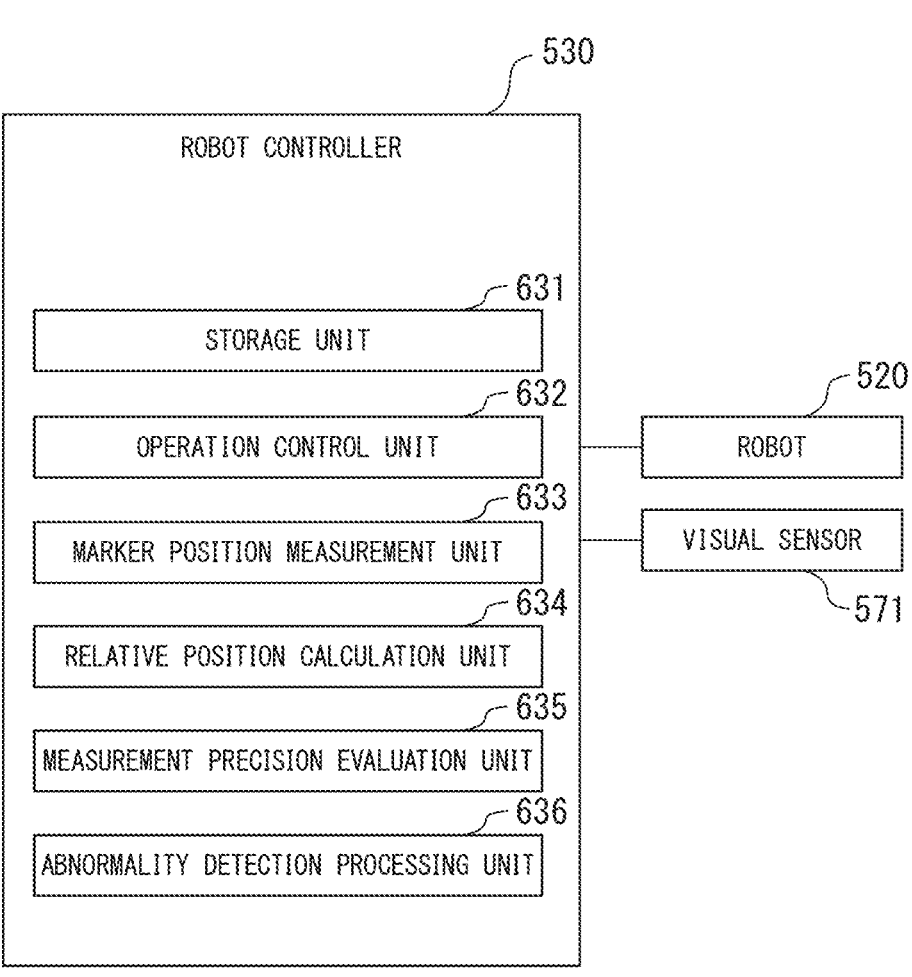
FIG. 10 is a functional block diagram of a robot controller in the robot system in FIG. 9.

FIG. 10 is a functional block diagram of the robot controller 530. As illustrated in FIG. 10, the robot controller 530 includes a storage unit 631 in which a control program and various other types of information are stored, an operation control unit 632 controlling operation of the robot 520 in accordance with the control program, a marker position measurement unit 633, a relative position calculation unit 634, a measurement precision evaluation unit 635, and an abnormality detection processing unit 636.

The marker position measurement unit 133 measures the three-dimensional position of a marker 504 by using the visual sensor 571. As an example, the marker position measurement unit 633 according to the present embodiment performs position measurement of the marker 504 by a stereo measurement method using the visual sensor 571 as a two-dimensional camera. In other words, the marker position measurement unit 633 changes the position of the visual sensor 571 configured with a two-dimensional camera, captures an image of the same marker 504 from two different positions, and calculates the three-dimensional position of the marker 504. The technique brings an advantage that a position measurement system can be provided at a low cost by using a relatively inexpensive two-dimensional camera. Another technique known in the relevant field for measuring the position of a marker (also referred to as a target mark or a visual marker) may be used.

Calibration data indicating the position of the two-dimensional camera (the visual sensor 571) with respect to a coordinate system (a mechanical interface coordinate system) set to the arm tip 521 of the robot 520 are stored in the storage unit 631. On the other hand, the robot controller 530 (the marker position measurement unit 633) can recognize the position and the posture of the arm tip 521 during operation of the robot 520. Accordingly, the robot controller 530 (the marker position measurement unit 633) can associate a sensor coordinate system of the two-dimensional camera (the visual sensor 571) at the time of image capture with a robot coordinate system by transforming the mechanical interface coordinate system into the robot coordinate system according to operation of the robot 520. Thus, the marker position measurement unit 633 can find the position of a target (the marker 504) as a three-dimensional position in the robot coordinate system.

The relative position calculation unit 634 finds a relative position of the robot 520 to the workspace (the machine tool 510) (in other words, a misaligned amount of the robot 520 from an intended position in the workspace), based on the measured marker position.

The operation control unit 632 controls the robot 520 in such a way that the robot 520 executes work at a correct position and a correct posture corrected from a specified position and a specified posture, based on the calculated relative positional relation between the workspace and the robot (the misaligned amount of the robot 520 from the intended position in the workspace).

The measurement precision evaluation unit 635 has a function of evaluating precision of a measurement result of measuring the position of one marker 504 by the marker position measurement unit 633.

The marker position measurement unit 633 may be configured to increase the number of measured markers when measurement precision is evaluated to be low by the measurement precision evaluation unit 635. As an example, measurement is performed as follows when the measurement is performed by using three markers. The three markers are placed at positions around a teaching point. The position and the posture of a coordinate system (a coordinate system of the workspace) is recognized assuming that the measured position of a first marker is the origin position, the measured position of a second marker is the position on an X-axis, and the measured position of a third marker is on an X-Y plane.

After recognizing a relative positional relation between the robot 520 and the workspace (the machine tool 510) by the aforementioned technique, the robot controller 530 causes the robot 1 to execute predetermined work (such as loading/unloading of a workpiece into/from the machine tool 510) while executing a correction operation in such a way that the positional relation between the robot 520 and the workspace is maintained to be an intended positional relation.

When an abnormality caused by a correction operation using a detection result of a marker is sensed in a process of executing predetermined work by the robot 1, the abnormality detection processing unit 636 returns the visual sensor 571 to an image capture position of the marker (i.e., a position where the detection being the cause of the abnormality has been performed) and stops the visual sensor 571 at the position by controlling the robot 520. For example, an abnormality caused by a correction operation refers to a case of the robot 520 not being able to place a workpiece at a correct position at placement of the workpiece (such as a seating error). Thus, the robot 520 (the visual sensor 571) automatically returns to the image capture position (i.e., a position where image capture for executing the correction operation has been performed) when an abnormality caused by the correction operation is detected, and therefore an operator can promptly and easily perform adjustment related to a marker detection function (such as parameter adjustment).

Each of the aforementioned robot system 100 described with reference to FIG. 1 to FIG. 8 and the aforementioned robot system 500 described with reference to FIG. 9 and FIG. 10 can be positioned as a robot system including a robot and a robot controller performing control in such a way as to cause the robot to execute predetermined work, based on a detection result of a detection target by a sensor, wherein the robot controller includes an abnormality detection processing unit performing, in response to sensing of an abnormality related to a detection operation by the sensor, control in such a way as to return the robot to the position at the time of detection being the cause of the abnormality and stop the robot at the position.

The functional allocations in the functional block diagrams illustrated in FIG. 3 and FIG. 10 are exemplifications, and various examples may be employed in terms of functional allocation. For example, a configuration in which a visual sensor controller with a function as the image processing unit 152 according to the aforementioned embodiment is placed as a device separate from the robot controller may be employed.

The functional blocks of the robot controller and the higher level controller that are illustrated in FIG. 3 and FIG. 10 may be provided by execution of various types of software stored in a storage device by processors in the devices or may be provided by a configuration mainly based on hardware such as an application specific integrated circuit (ASIC) etc.

A program executing various types of processing according to the aforementioned embodiment, such as alignment control in FIG. 5 and abnormality detection processing in FIG. 7, can be recorded on various computer-readable recording media (such as semiconductor memories such as a ROM, an EEPROM, and a flash memory, a magnetic recording medium, and optical disks such as a CD-ROM and a DVD-ROM).

REFERENCE SIGNS LIST

10 Robot
20 Conveyor controller
25 Conveyor
30 Hand
40 Teaching device
41 Display unit
50 Robot controller
51 Processor
52 Memory
53 Input-output interface
54 Operation unit
60 Higher level controller
61 Processor
62 Memory
63 Display unit
64 Operation unit
65 Input-output interface
71, 72, 73 Image capture device
81, 91 Workpiece
100 Robot system
151 Operation control unit
152 Image processing unit
153 Abnormality detection processing unit
154 Information recording unit
155 Operation program
161 Control unit
162 Abnormality processing unit
163 Information recording unit
164 Control program
500 Robot system
504 Marker
510 Machine tool 520 Robot
530 Robot controller
550 Teaching device
571 Visual sensor
631 Storage unit
632 Operation control unit
633 Marker position measurement unit
634 Relative position calculation unit
635 Measurement precision evaluation unit
636 Abnormality detection processing unit

The invention claimed is:

1. A robot system, comprising:
a robot; and
a robot controller configured to control the robot to execute predetermined work based on a detection result of a detection target by a sensor,
wherein the robot controller includes an abnormality detection processing unit configured to, in response to sensing of an abnormality related to a detection operation by the sensor, control the robot to return to a position at a time of detection being a cause of the abnormality and stop the robot at the position, and
wherein the abnormality detection processing unit is configured to control the sensor to operate in a state of the robot being returned to the position at a time of sensing of the abnormality and being stopped, and cause an output result of the sensor to be displayed on a display.

2. The robot system according to claim 1, wherein
the robot controller is configured to control the robot to execute the predetermined work while detecting the detection target by the sensor, and
the abnormality detection processing unit is configured to, in response to sensing of the abnormality in the detection operation by the sensor, control the robot to return to the position at the time of sensing of the abnormality and stop the robot at the position.

3. The robot system according to claim 1, further comprising:
a conveying device configured to convey an article; and
a higher level controller configured to control the conveying device and the robot controller, wherein
the abnormality detection processing unit is further configured to output, in response to sensing of the abnormality, a signal indicating sensing of the abnormality to the higher level controller, and
the higher level controller includes an abnormality processing unit configured to, in response to reception of the signal, control the conveying device to return to the position at the time of sensing of the abnormality and stop the conveying device at the position.

4. The robot system according to claim 1, wherein
the sensor is an image capture device, and
the output result is an image captured by the image capture device.

5. The robot system according to claim 1, wherein the abnormality detection processing unit is configured to cause detailed information about the abnormality to be displayed on the display in response to sensing of the abnormality.

6. The robot system according to claim 1, wherein the abnormality detection processing unit is configured to cause information about an operating condition of the robot at the time of sensing of the abnormality to be displayed on the display.

7. The robot system according to claim 1, wherein
the sensor is a visual sensor mounted on the robot, the robot controller is configured to execute a correction operation of correcting a position of the robot relative to a workspace by detecting, by the visual sensor, one or more markers placed in the workspace, the abnormality is caused by the correction operation, and in response to sensing of the abnormality, the abnormality detection processing unit is configured to control the robot in such a way that the robot returns to a position where a marker of the one or more markers is detected by the visual sensor.

8. The robot system according to claim 1, further comprising a teaching device configured to teach operations to the robot, the teaching device being connected to the robot controller, wherein the display is provided on the teaching device.

9. A robot controller, comprising:

an operation control unit configured to control the robot to execute predetermined work based on a detection result of a detection target by a sensor; and an abnormality detection processing unit configured to, in response to sensing of an abnormality related to a detection operation by the sensor, control the robot to return to a position at a time of detection being a cause of the abnormality and stop the robot at the position, wherein the abnormality detection processing unit is configured to control the sensor to operate in a state of the robot being returned to the position at a time of sensing of the abnormality and stopping, and cause an output result of the sensor to be displayed on a display.

* * * * *